M. G. WORTH.
WASHER MAKING MACHINE.
APPLICATION FILED DEC. 28, 1910.
1,015,752.
Patented Jan. 23, 1912.
2 SHEETS—SHEET 2.
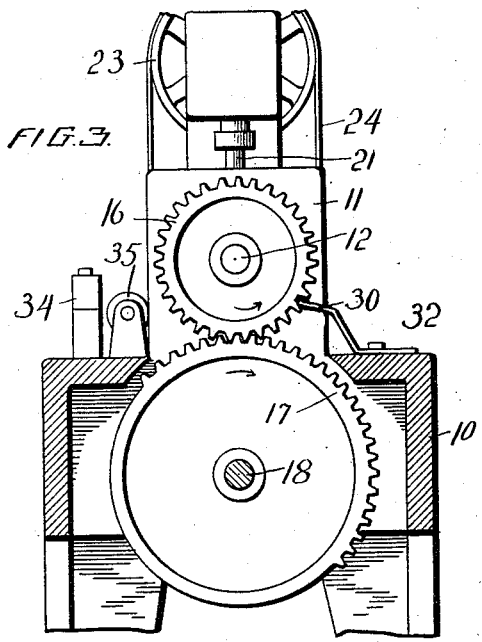
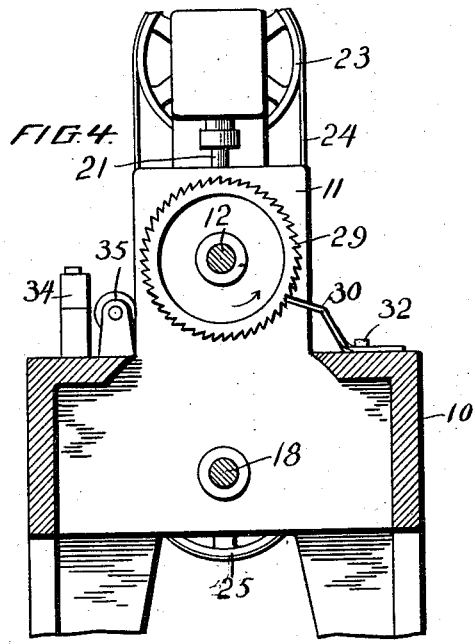
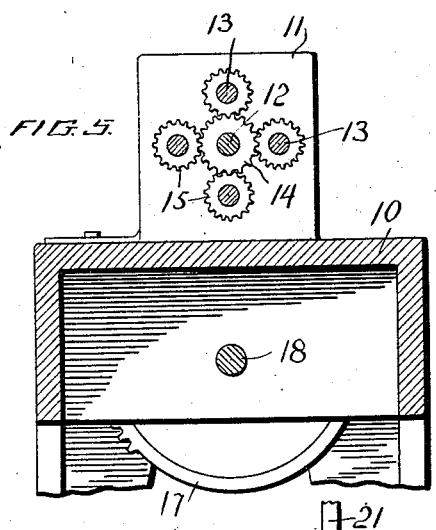
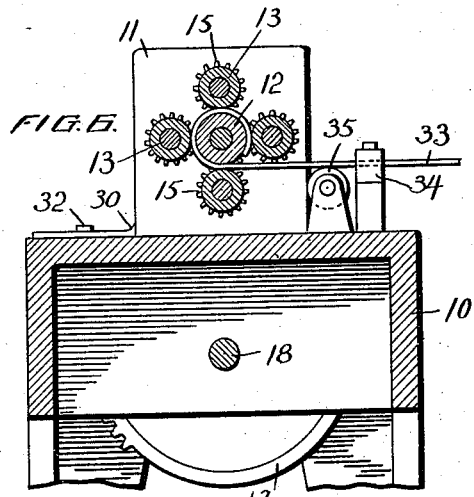
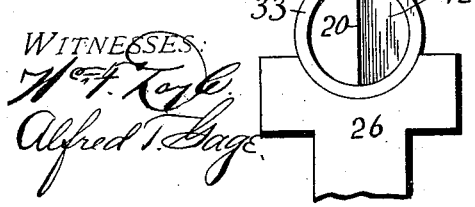
WITNESSES
Wm F Kayle
Alfred T Gage
INVENTOR
Mason G. Worth
BY
E B Stocking
Attorney

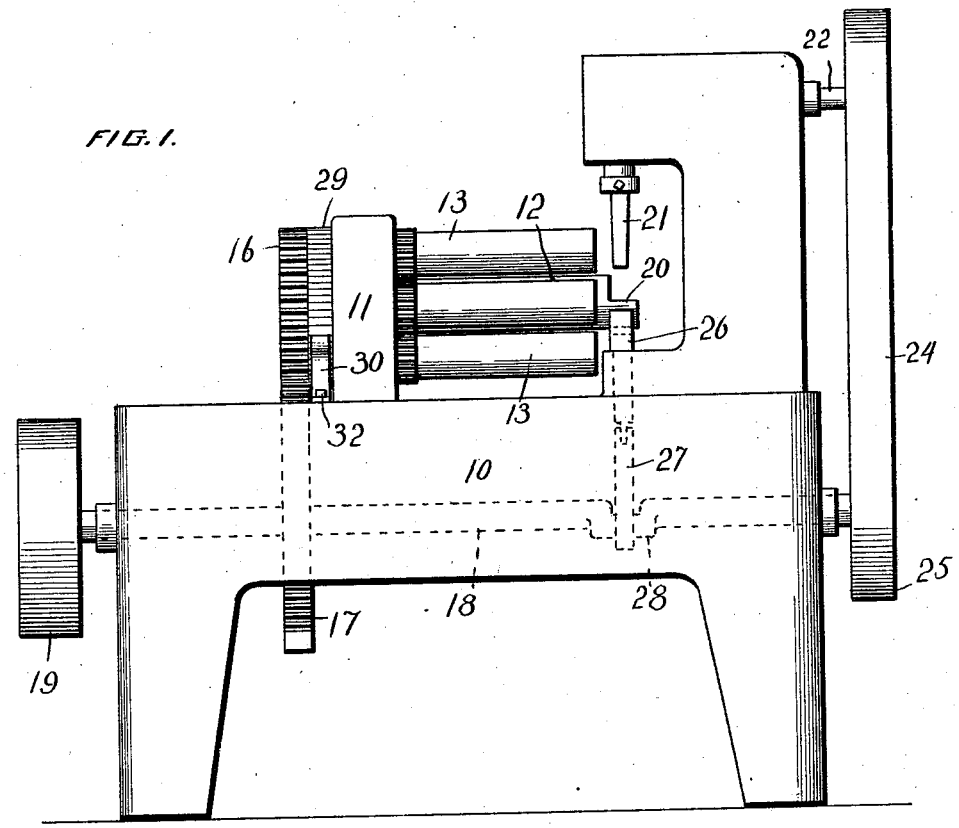
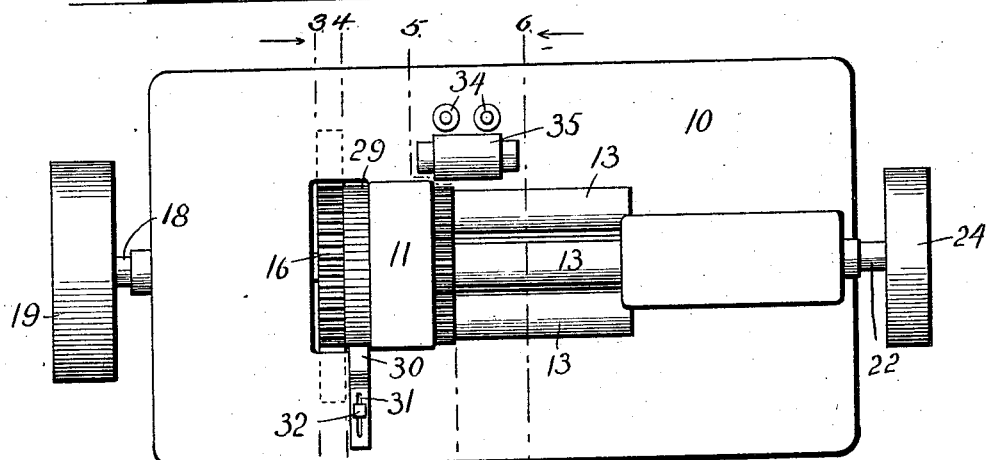

UNITED STATES PATENT OFFICE.

MASON G. WORTH, OF NEW YORK, N. Y., ASSIGNOR TO CHARLES S. DAVIS, OF NEW YORK, N. Y.

WASHER-MAKING MACHINE.

1,015,752. Specification of Letters Patent. Patented Jan. 23, 1912.

Application filed December 28, 1910. Serial No. 599,772.

*To all whom it may concern:*

Be it known that I, MASON G. WORTH, a citizen of the United States, residing at New York, county of New York, State of New York, have invented certain new and useful Improvements in Washer - Making Machines, of which the following is a specification, reference being had therein to the accompanying drawing.

This invention relates to a washer making machine and particularly to a construction adapted to produce a coiled lock washer.

The invention has for an object to provide a novel and improved construction of machine comprising an intermittently rotated coiling mandrel having a cutting face at its delivery end adapted to coöperate with an automatically operated cutting tool so as to continuously coil the washers and cut off a completed washer at each revolution of the mandrel, the parts being so constructed and arranged as to properly time the several operations thereof.

Other and further objects and advantages of the invention will be hereinafter set forth and the novel features thereof defined by the appended claims.

In the drawing—Figure 1 is a side elevation of the machine; Fig. 2 is a top plan thereof; Fig. 3 is a vertical section on line 3—3 of Fig. 2; Fig. 4 is a similar view on line 4—4 of Fig. 2; Fig. 5 is a section on line 5—5 of Fig. 2; Fig. 6 is a like view on line 6—6 of Fig. 2; Fig. 7 is an end elevation of the cutting face of the mandrel; Fig. 8 is a detail side elevation of the delivery end of the mandrel; and Fig. 9 is a detail of the completed washer.

Like numerals of reference refer to like parts in the several figures of the drawing.

The numeral 10 indicates the base or frame of the machine which is provided with a bearing standard 11 in which a coiling mandrel 12 is rotatably mounted. This mandrel has disposed about its periphery a series of coiling rollers 13 which coöperate therewith and are driven in any desired manner, for instance by a gear 14 upon the mandrel meshing with a gear 15 upon each of the rollers. The mandrel 12 is provided with a driving gear 16 which is intermittently rotated by means of a mutilated or intermittent gear 17 mounted on the main driving shaft 18 which is provided with a driving pulley 19.

The mandrel is formed at its delivery end with a cutting face 20 of any desired construction, for instance a segmental extension as shown in Fig. 7. This cutting face is adapted to coöperate with a reciprocating cutting tool or punch 21 which may be driven in any desired manner, for instance from the shaft 22, which carries a pulley 23 and receives power by means of a belt 24 extending to a driving pulley 25 upon the main shaft 18. Beneath the cutting face 20, a reciprocating anvil 26 is mounted and adapted to operate in unison with the punch to support the end of the mandrel during the cutting operation. This anvil may be operated in any desired manner, for instance by means of a pitman 27 carried by a crank 28 upon the driving shaft 18 as shown by dotted lines in Fig. 1. For the purpose of forming a space or gap between the ends of the coiled washer, and retaining the parts in proper position during the cutting operation, a ratchet gear 29 is mounted upon the shaft of the mandrel and coöperates with a spring pawl 30. This pawl is adjustably mounted upon the base by means of a slot 31 and set-screw 32 so that the frictional contact thereof with the ratchet may be varied to offer more or less resistance to a back movement of the mandrel shaft, due to the spring of the steel from which the washer is formed. The bar or piece of material 33 to be coiled, is fed between guide rollers 34 mounted upon the base and rests upon a bearing roller 35 as shown in Fig. 6.

In the operation of the machine, the bar to be coiled is fed between the mandrel and coiling rollers at the end thereof adjacent the bearing standard and the successive coils as formed force those previously made toward the delivery end of the mandrel, producing a spiral spring thereon as shown in Fig. 8. The coil at the free end of the mandrel surrounds the cutting face thereof and the intermittent driving gear is disposed to allow the mandrel to cease its rotation with the cutting face in a vertical line as shown in Fig. 7. As the mutilated gear leaves the driving gear of the mandrel, the tension of the coiled wire produces a slight backward movement of the mandrel sufficient to form the space or gap between the ends of the washer, thus retracting the free end of the coil from the cutting face of the mandrel. This reverse movement is adjusted and governed by the tension or friction of the spring pawl upon the teeth of the ratchet wheel. If the pawl be moved into close contact with these teeth, only a very small backward movement can occur, while if the pawl have only a slight contact with the ratchet, a greater backward movement is permitted before the pawl brings the mandrel to rest. At this time, the cutting tool descends and coöperates with the cutting face of the mandrel, while the anvil rises beneath and contacts with the coil upon the mandrel to support the latter, holding the coil in position during the cutting operation. It will thus be seen that the invention presents a simple, efficient and economically constructed machine by which a coil may be intermittently formed and intermittently cut into the completed article during the continuous operation of the machine, thus obviating separate operations for cutting the spring coil into the washer of the character shown.

Having described my invention and set forth its merits, what I claim and desire to secure by Letters Patent is—

1. In a washer making machine, the combination with an intermittently rotated mandrel, of an automatically operated cutting tool disposed at the delivery end thereof and frictional means for retarding the reverse movement of said mandrel.

2. In a washer making machine, the combination with an intermittently rotating mandrel, of means for retarding the reverse movement of said mandrel, and an automatically operated cutting tool disposed at the delivery end thereof and coöperating with a cutting face thereon.

3. In a washer making machine, the combination with a mandrel intermittently rotated in one direction, of adjustable means for allowing said mandrel to rotate in a reverse direction, and an automatically operated cutting tool co-acting with said mandrel.

4. In a washer making machine, the combination with an intermittently rotated mandrel, of an automatically operated cutting tool disposed at the delivery end thereof, and non-positive means for retarding a reverse movement of said mandrel.

5. In a washer making machine, the combination with a mandrel, of means for intermittently driving said mandrel in one direction, and means for allowing a reverse movement of said mandrel when the intermittent driving means is out of operation.

6. In a washer making machine, the combination with a coiling mandrel provided with a driving gear, of a mutilated gear coöperating therewith, a series of coiling rollers surrounding said mandrel and geared to be driven thereby, automatic means for allowing said mandrel to rotate in a reverse direction, a cutting face at the delivery end of said mandrel, and a reciprocating cutting tool coöperating with said face.

7. In a washer making machine, the combination with a coiling mandrel provided with a driving gear, of a mutilated gear coöperating therewith, a series of coiling rollers surrounding said mandrel and geared to be driven thereby, a cutting face at the delivery end of said mandrel, a reciprocating cutting tool coöperating with said face, and a vertically reciprocating anvil disposed beneath said face.

8. In a washer making machine, the combination with a coiling mandrel provided with a driving gear, of a mutilated gear coöperating therewith, a series of coiling rollers surrounding said mandrel and geared to be driven thereby, a cutting face at the delivery end of said mandrel, a reciprocating cutting tool coöperating with said face, a reciprocating anvil disposed beneath said face, a driving shaft for said mutilated gear provided with a crank portion for operating said anvil, and a gearing from said driving shaft to operate said cutter tool.

9. In a washer making machine, the combination with a coiling mandrel provided with a driving gear, of a mutilated gear coöperating therewith, a series of coiling rollers surrounding said mandrel and geared to be driven thereby, a cutting face at the delivery end of said mandrel, a reciprocating cutting tool coöperating with said face, a reciprocating anvil disposed beneath said face, a driving shaft for said mutilated gear provided with a crank portion for operating said anvil, a gearing from said driving shaft to operate said cutter tool, means for guiding material at the geared end of said mandrel, a toothed wheel carried by the shaft of said mandrel, and a spring pawl coöperating with said wheel.

10. In a washer making machine, the combination with a coiling mandrel having a cutting face at its free end, of means for intermittently rotating said mandrel, a reciprocating cutting tool disposed to coöperate with said face, a toothed wheel carried by the shaft of said mandrel, and a spring pawl coöperating with said wheel for retarding the reverse movement of said mandrel.

11. In a washer making machine, the combination with a coiling mandrel having a cutting face at its free end, of means for intermittently rotating said mandrel, a reciprocating cutting tool disposed to coöperate with said face, a toothed wheel carried by the shaft of said mandrel, a spring pawl coöperating with said wheel, and means for adjusting said pawl toward and from said wheel.

12. In a washer making machine, a base provided with a bearing standard, a mandrel mounted in said standard and provided with a driving gear, a series of coiling rollers surrounding said mandrel and geared for rotation thereby, an angular cutting face at the free end of said mandrel, an automatically operated cutting tool coöperating with said face, a simultaneously operated vertically reciprocating anvil disposed beneath said face, a driving shaft mounted in said base, a mutilated gear carried by said shaft and meshing with the gear of said mandrel, and connections from said shaft to automatically operate said cutting tool and anvil.

13. In a washer making machine, a base provided with a bearing standard, a mandrel mounted in said standard and provided with a driving gear, a series of coiling rollers surrounding said mandrel and geared for rotation thereby, an angular cutting face at the free end of said mandrel, an automatically operated cutting tool coöperating with said face, a simultaneously operated anvil disposed beneath said face, a driving shaft mounted in said base, a mutilated gear carried by said shaft and meshing with the gear of said mandrel, connections from said shaft to automatically operate said cutting tool and anvil, a ratchet wheel carried by the shaft of said mandrel, and a yielding pawl coöperating with said wheel.

14. In a washer making machine, a base provided with a bearing standard, a mandrel mounted in said standard, and provided with a driving gear, a series of coiling rollers surrounding said mandrel and geared for rotation thereby, an angular cutting face at the free end of said mandrel, an automatically operated cutting tool coöperating with said face, a simultaneously operated anvil disposed beneath said face, a driving shaft mounted in said base, a mutilated gear carried by said shaft and meshing with the gear of said mandrel, connections from said shaft to automatically operate said cutting tool and anvil, a ratchet wheel carried by the shaft of said mandrel, a spring pawl having a slotted plate mounted upon said base, and means for adjustably securing said plate relative to said wheel.

15. In a washer making machine, a base provided with a bearing standard, a mandrel mounted in said standard and provided with a driving gear, a series of coiling rollers surrounding said mandrel and geared for rotation thereby, an angular cutting face at the free end of said mandrel, an automatically operated cutting tool coöperating with said face, a simultaneously operated anvil disposed beneath said face, a driving shaft mounted in said base, a mutilated gear carried by said shaft and meshing with the gear of said mandrel, connections from said shaft to automatically operate said cutting tool and anvil, a ratchet wheel carried by the shaft of said mandrel, a spring pawl having a slotted plate mounted upon said base, means for adjustably securing said plate relative to said wheel, a bearing roller mounted adjacent the geared end of the coiling rollers and opposite vertically disposed guide rollers at one side of said bearing roller.

In testimony whereof I affix my signature in presence of two witnesses.

MASON G. WORTH.

Witnesses:
CHARLES E. STINSON,
HENRY P. ALDEN.